United States Patent [19]

Ljungholm et al.

[11] Patent Number: 5,590,733

[45] Date of Patent: Jan. 7, 1997

[54] SHOCK ABSORBING AND SPRUNG SUSPENSION SYSTEM

[75] Inventors: Bengt Ljungholm, Angered; Nils Nilsson, Göteborg; Staffan Wendeberg, Torslanda; Anders Kärrberg, Lerum; Mikael Schill, Göteborg, all of Sweden

[73] Assignee: AB Volvo, Sweden

[21] Appl. No.: 313,306

[22] PCT Filed: Apr. 7, 1992

[86] PCT No.: PCT/SE92/00222

§ 371 Date: Oct. 5, 1994

§ 102(e) Date: Oct. 5, 1994

[87] PCT Pub. No.: WO93/19973

PCT Pub. Date: Oct. 14, 1993

[51] Int. Cl.[6] .................................................. B62D 33/06
[52] U.S. Cl. ........................................ 180/89.14; 267/220
[58] Field of Search ............................ 180/89.13, 89.16;
188/321.11, 322.19; 267/217, 220

[56] References Cited

U.S. PATENT DOCUMENTS

| | | | |
|---|---|---|---|
| 3,397,910 | 8/1968 | Schmidt et al. | 296/35 |
| 3,944,017 | 3/1976 | Foster | 180/89.15 |
| 4,452,328 | 6/1984 | Oudelaar | 180/89.15 |
| 4,568,067 | 2/1986 | Iwala | 267/220 |
| 5,158,269 | 10/1992 | Hein et al. | 267/220 |
| 5,330,166 | 7/1994 | Aoki | 267/220 |

FOREIGN PATENT DOCUMENTS

| | | | |
|---|---|---|---|
| 0082710 | 6/1983 | European Pat. Off. | |
| 318438 | 5/1989 | European Pat. Off. | 180/89.14 |
| 3016545 | 11/1981 | Germany . | |
| 3033395 | 2/1983 | Germany . | |
| 3928945 | 3/1991 | Germany . | |
| 4240449 | 6/1994 | Germany | 180/89.14 |
| 48271 | 3/1984 | Japan | 180/89.14 |
| 2019484 | 11/1992 | WIPO | 180/89.14 |

Primary Examiner—Robert J. Oberleitner
Assistant Examiner—Peter M. Poon
Attorney, Agent, or Firm—Lerner, David, Littenberg, Krumholz & Mentlik

[57] ABSTRACT

A shock absorber and suspension apparatus are disclosed for supporting a tiltable vehicle cab on a chassis including a first shock absorber and corresponding spring attached in parallel to each other and releasably coupled between the vehicle cab and the chassis, a first coupler attached to the vehicle cab, a second coupler attached to both the first shock absorber and the spring, the first shock absorber including an attachment for attaching the upper portion of the first shock absorber to the second coupler, the attachment including a damper for damping motion of the vehicle cab, the spring including a carrier for bearing the static load acting on the shock absorber and suspension apparatus separately from the first shock absorber, and a second shock absorber connecting the second coupler to the chassis and arranged substantially transverse to the first shock absorber.

12 Claims, 5 Drawing Sheets

SHOCK ABSORBING AND SPRUNG SUSPENSION SYSTEM

TECHNICAL FIELD

The present invention concerns a shock-absorbing and sprung suspension arrangement comprising at least one shock absorber and one spring for each suspension location, whereby the shock absorber and the spring are coupled parallel to each other between a lower Dart such as a chassis which supports the suspension and an upper part such as a vehicle cab which is sprung-supported and shock-absorbingly-supported by means of the suspension arrangement, whereby the shock absorber presents a lower fastening for connection to said lower part and an upper fastening for damped connection to said upper part, said upper part presenting a spring member and said suspension arrangement additionally being provided with la lockable coupling arrangement for releasable coupling of the vehicle cab to the suspension arrangement such that the vehicle cab is supported by one or more suspension arrangements via the coupling arrangement which consists of both a first coupling part attached to said upper part and of a second coupling part attached to the suspension arrangement with a lock mechanism for releasable locking of the coupling parts to each other.

STATE OF THE ART

For the suspension of e.g. a truck cab on a chassis, a combination of springs and shock absorbers is normally used whereby the spring's upper fastening is connected to the upper part of the shock absorber. The cab is normally fixed to this by means of a rubber bush. In order that the shock absorber can support the static load, i.e. the intrinsic weight of the cab, the bush has to be designed for this load bearing function. This means in practice that the bush has to be given a very high stiffness. Even if a bush with low stiffness is chosen, which can be obtained e.g. by using a low rubber hardness, the risk is still present that the bush will set after a time and still obtain a high stiffness. The disadvantage with these known, stiff, static load-bearing bushes is that noise is transferred to the cab where the requirements for a good driver environment are being raised ever higher. With high stiffness an undesirable transmittance of chassis noise to the cab occurs. A bush with low stiffness can of course reduce the transmittance of chassis noise to the cab but cannot fulfil the requirements for static load bearing for longer periods of time.

SUMMARY OF THE INVENTION

The object of the present invention is to construct a shock absorbing and sprung suspension arrangement such that the requirements on the load bearing ability concerning static load and the requirements for low chassis noise transmittance can both be fulfilled at the same time.

Said object is achieved by means of a shock absorbing and sprung suspension arrangement which is characterized in that said second coupling part is connected to the suspension arrangement both via said spring element in the shock absorber's upper fastening and via a carrier member which is separate from said fastening and which is arranged in the upper end of the spring, said carrier member being arranged to take the static load acting on the suspension arrangement and thereby statically unload the shock absorber's upper fastening, the spring member of which can thereby be given a well-adapted stiffness which imparts high-grade vibration-isolation characteristics to the suspension arrangement.

DESCRIPTION OF THE FIGURES

The invention will now be described in more detail with reference to an embodiment and the accompanying drawings, in which.

DESCRIPTION OF PREFERRED EMBODIMENTS

Figure 1:
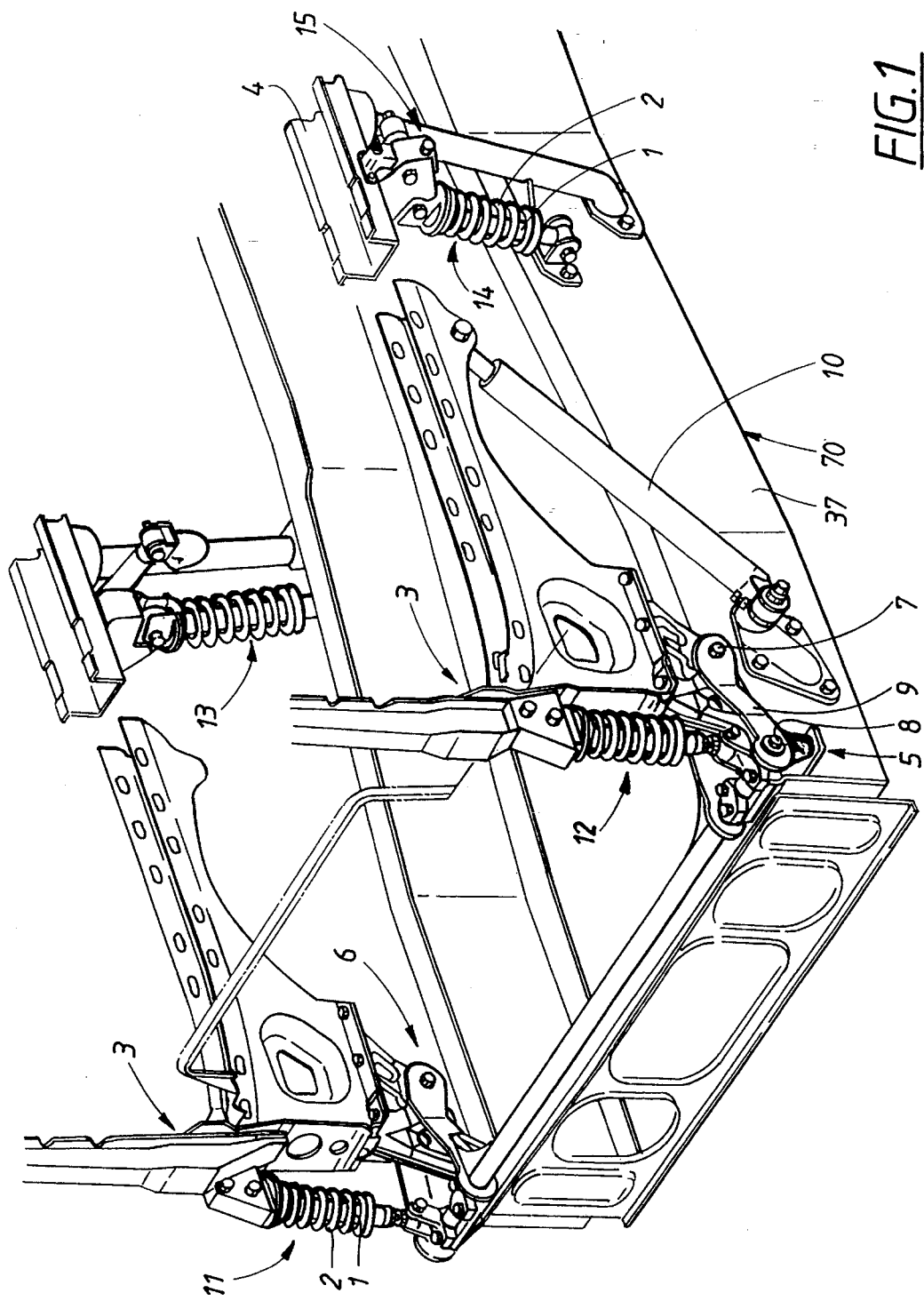
FIG. 1 shows a cab suspension which includes suspension arrangements according to a first embodiment of the invention.

The suspension arrangement according to the invention is of the type which is constructed as a shock absorber 1 and a spring 2 which form an integrated unit which, together with a number of further units, forms a suspension for a vehicle cab 3 of which only parts of certain chassis members 4 are shown in FIG. 1 which will be described first. The suspension arrangements according to the first embodiment as in FIG. 1- are made up of mechanical coil springs which are concentrically arranged around their respective shock absorbers and are dimensioned primarily to take up the static load occurring due to the cab whilst the shock absorber is adapted primarily to take up the dynamic forces caused by the cab's movement. The cab suspension shown supports a cab of the tippable type. Thus, two of the suspension arrangements, the front ones in the depicted embodiment, are arranged at each of their respective pivot locations 5, 6 between the cab and the vehicle's lower part which is constituted by the vehicle chassis. Each of these pivot locations presents two pivot axes 7, 8, not for the purpose of forming a rigid joint, but to allow sprung suspension. This joint is described in more detail in the applicant's earlier patent application 9101327-6 and should therefore not require any further explanation in this application. It is sufficient to establish that both pivot locations 5, 6 form a so-called link arm suspension with a link arm 9 which is pivotally fixed between said two pivot axes 7, 8 and thus makes the cab not only tippable but also gives a sprung and shock-absorbing movement in the vertical direction by means of the suspension arrangements according to the invention. The tip movement for the cab is provided hydraulically by a hydraulic power arrangement 10 which is fixed between the cab chassis 4 and the vehicle chassis.

Both of the suspension arrangements 11, 12 which are arranged at the link arm suspensions form the front cab suspension, whilst the two other suspension arrangements 13, 14 together form the rear cab suspension.

Figure 2:
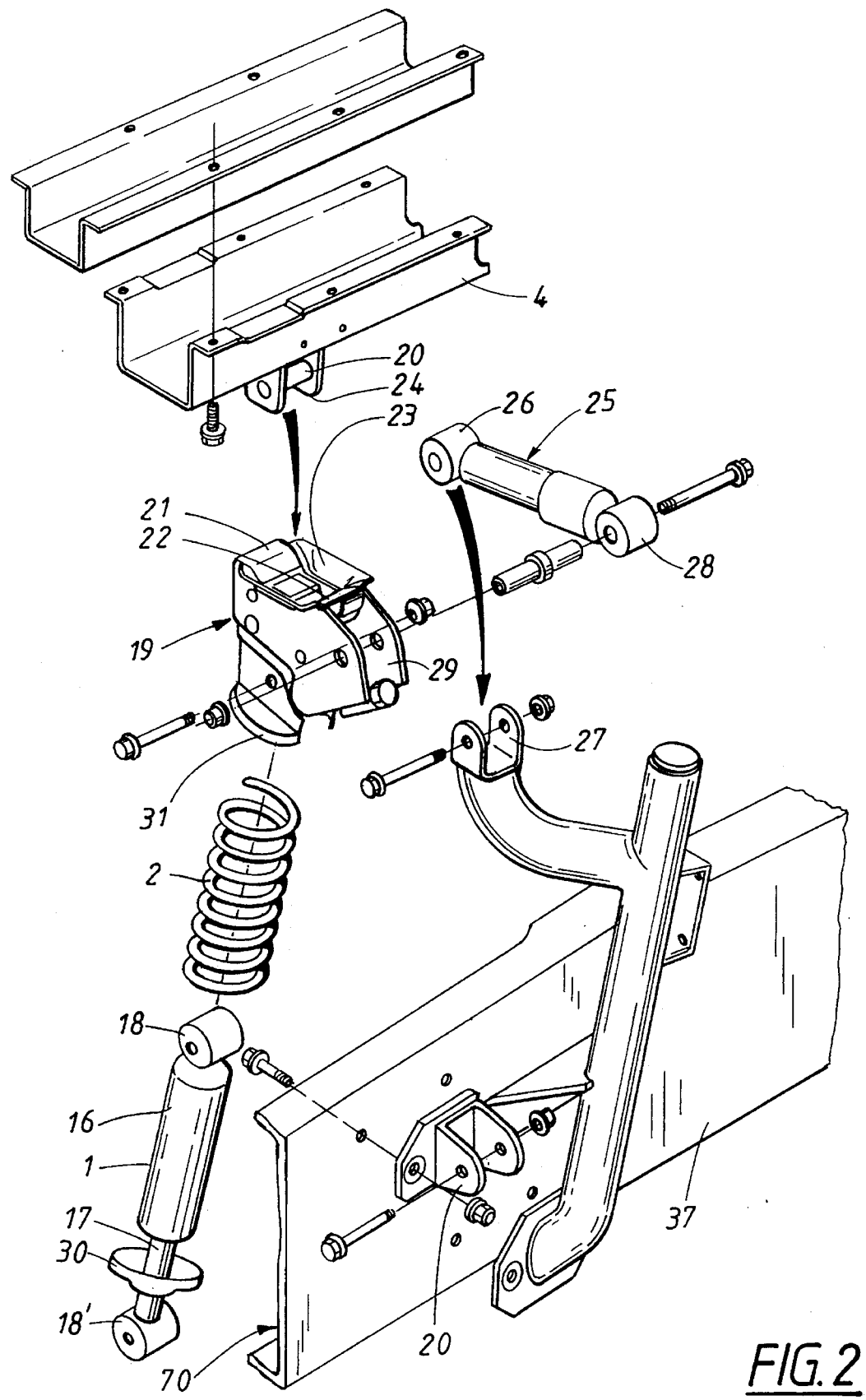
FIG. 2 shows, on a larger scale, an exploded view of a cab suspension according to FIG. 1 including a suspension arrangement according to the invention.

The rear cab suspension has the same construction as the front suspension in as far as concerns the integrated concentric suspension by means of shock absorber 1 and spring 2, but the cab is here coupled together with the upper end of the suspension arrangements by means of a coupling arrangement 15, the construction of which can more clearly be seen in FIG. 2. The other parts of the suspension arrangement can also be seen in FIG. 2, to which reference is now made. The shock absorber 1 can be of a conventional type in the form of a telescopic hydraulic unit with two parts 16, 17 displaceable telescopically with respect to each other, the outer ends of which form the shock absorber's upper fastening 18 and lower fastening 18 respectively. By means of a closed hydraulic fluid system and a valve system in the shock absorber, forces are opposed in a per se known manner in the longitudinal direction of the shock absorber which tries to change its length thus bringing about a damping of the movement. The lower shock absorber fastening is suitably foreseen with a non-depicted elastic, shock-absorbing bush, by means of which the shock absorber is fixed in a bracket 20 which is fixedly attached to one of the longitudinal chassis members 37 of the vehicle chassis 70. The upper fastening for the shock absorber is fixedly attached to a coupling part 19 included in the coupling arrangement for coupling together the suspension arrangement and the cab chassis 4. This is achieved by means of a coupling part 20 fixedly attached to the cab chassis, said coupling part 20 preferably being called the first coupling part whilst the coupling part 19 is called the second coupling part. The coupling part 19 is provided with a lock mechanism (not shown) which is moveable between a locking position and a releasing position, which occurs for example electrically by means of maneuvering from the driver's cab. The first coupling part is made as a transversely positioned coupling rod and is equipped with abutment surfaces which are both turned towards and turned away from the second coupling part in the separated position as shown in FIG. 2. In the coupled position of both the coupling parts 19, 20, the lock mechanism in the second lock part 19 is arranged to be moved between a lock position in which the first coupling part 20 is held in the second coupling part by cooperation with said abutment surfaces turned away from this, and a releasing position in which the first coupling part is allowed to be moved out of the second coupling part, thus permitting tipping of the cab. The oblique guiding surfaces 21, 22 in the opening 23 in the second coupling part ensure that the second coupling part is guided in by means of cooperation with the edge surfaces 24 on the first coupling part so that a correct coupling position is ensured. Said abutment surfaces in the coupling part 24 facing the coupling part 19 can be used in order to operate the lock mechanism.

The rear suspension arrangements are thus moveable and shock-absorbingly suspended at their upper ends in as far as concerns movement in the sideways direction or, more precisely defined, transverse to the longitudinal direction of the suspension arrangements and transverse to the longitudinal direction of the vehicle, i.e. the vehicle chassis 70. This is achieved by means of a transverse shock absorber 25 which is coupled to a bracket 27 fixed to vehicle chassis 37 with one of its fastenings 26 and attached to the second coupling part 29 with its other fastening 28.

The spring 2 attachment is arranged between a lower spring cup 30 which is attached to the lower part of the shock absorber 1, and an upper spring cup 31 to which the second coupling part 19 is fixedly attached. The connection of the spring and the shock absorber with the second coupling part will be described in more detail below with reference to FIG. 5.

Figure 3:
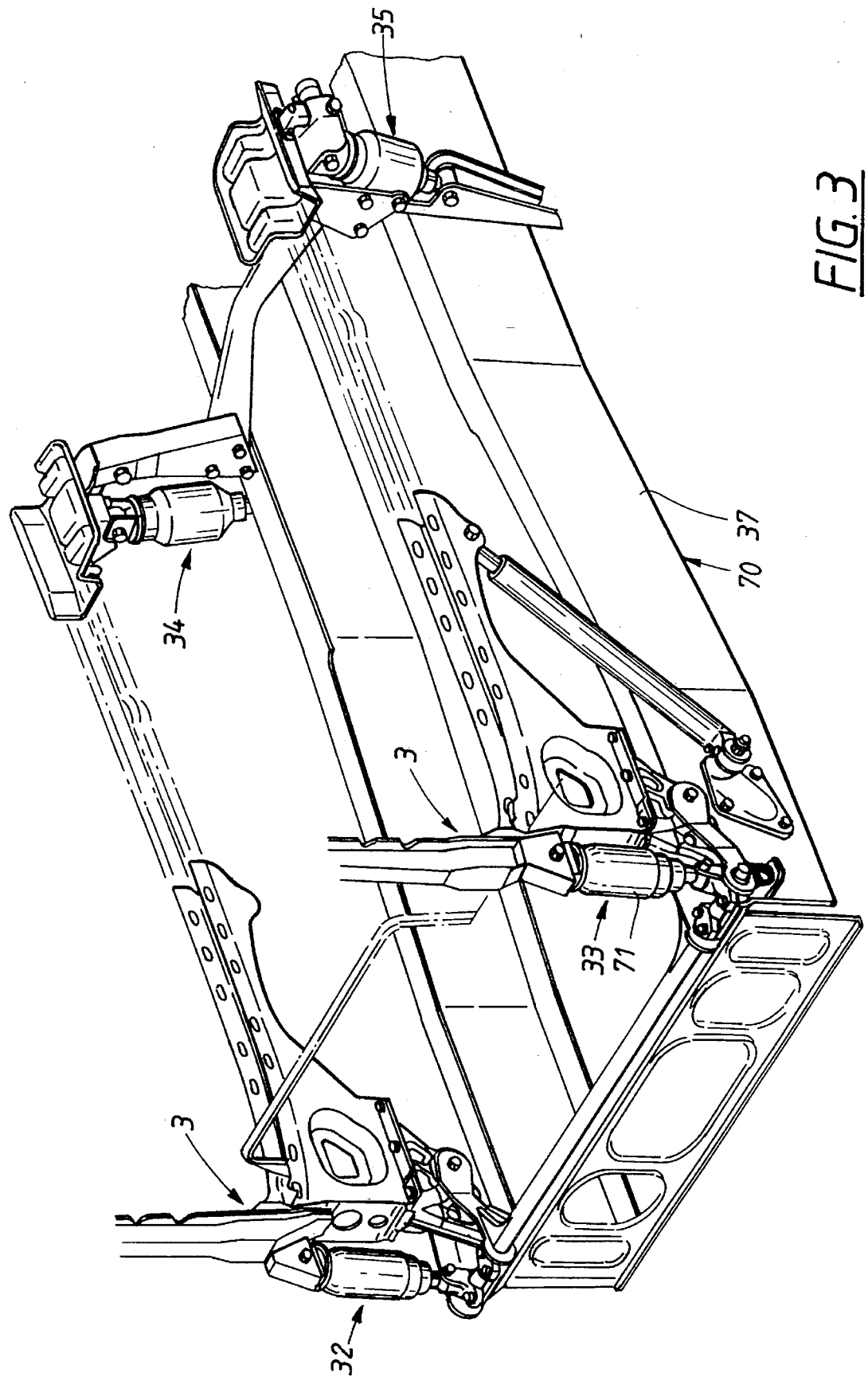
FIG. 3 shows a cab suspension including suspension arrangements according to a second embodiment of the invention.

In a view corresponding to FIG. 1, FIG. 3 shows a second embodiment of a cab suspension namely by means of air springs 71 which, in principle in the same way as with the embodiment using mechanical springs, each concentrically surrounds its respective shock absorber for each of the suspension arrangements 32, 33, 34 and 35. The principal construction of the cab suspension is thus completely in accordance with the embodiment using mechanical springs according to FIG. 1, for which reason reference is made to FIG. 1.

Figure 4:
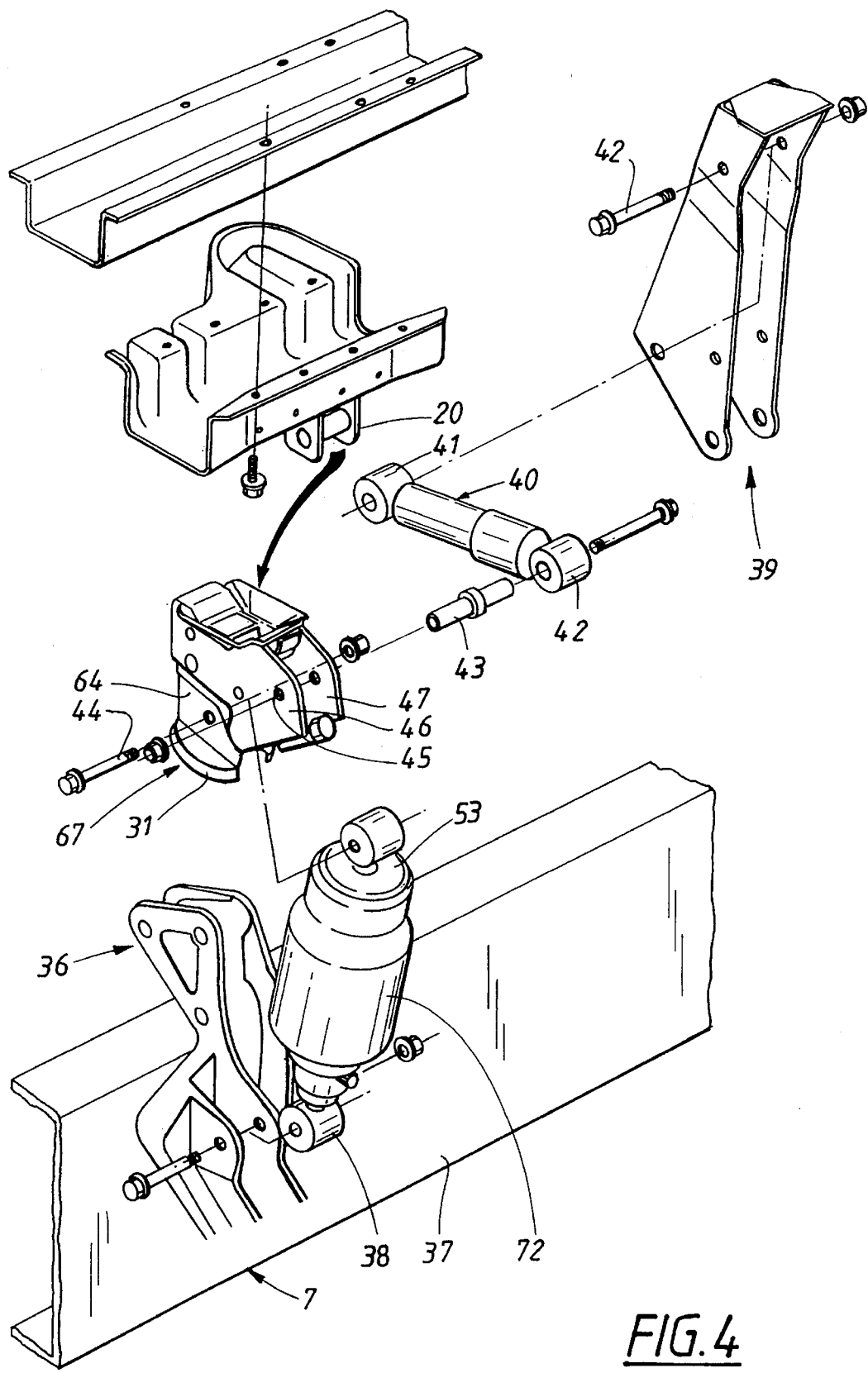
FIG. 4 shows, on a larger scale, an exploded view of a cab suspension arrangement according to FIG. 3 including a suspension arrangement according to the invention.

As is clear from FIG. 4 which principally corresponds to the exploded view in FIG. 2 but shows a suspension arrangement using air springs, certain component differences exist with respect to the mechanical springs, more precisely when considering the rear cab suspension with the coupling arrangement 19, 20, such as a different construction of the brackets for the attachment of the suspension arrangement. Thus one common base bracket 36 is provided for the complete suspension arrangement, said bracket 36 being fixedly attached to one longitudinal chassis member 37 of the vehicle chassis 70. This presents both an attachment for the shock absorber's lower fastening 38 as well as an attachment for the bracelet 39 which forms an attachment for the transverse shock absorber 40 of the suspension arrangement, of which one of the fastenings 41 is intended to be anchored by means of a screw 42 passed through the bracket 39 and nut. This second fastening 42 of the shock absorber 40 is anchored via a sleeve 43 passing through the coupling part 19. This is fixedly held to the coupling part 19 by means of a screw 44 which is passed through the hole 45 in two walls 46, 47 of this which are separated by a distance from each other, and attached by means of nuts to two side parts 46, 47 of the coupling part arranged at a distance from each another. Both shock absorber fastenings 41, 42 present elastic bushes for taking up the vibration movements.

Figure 5:
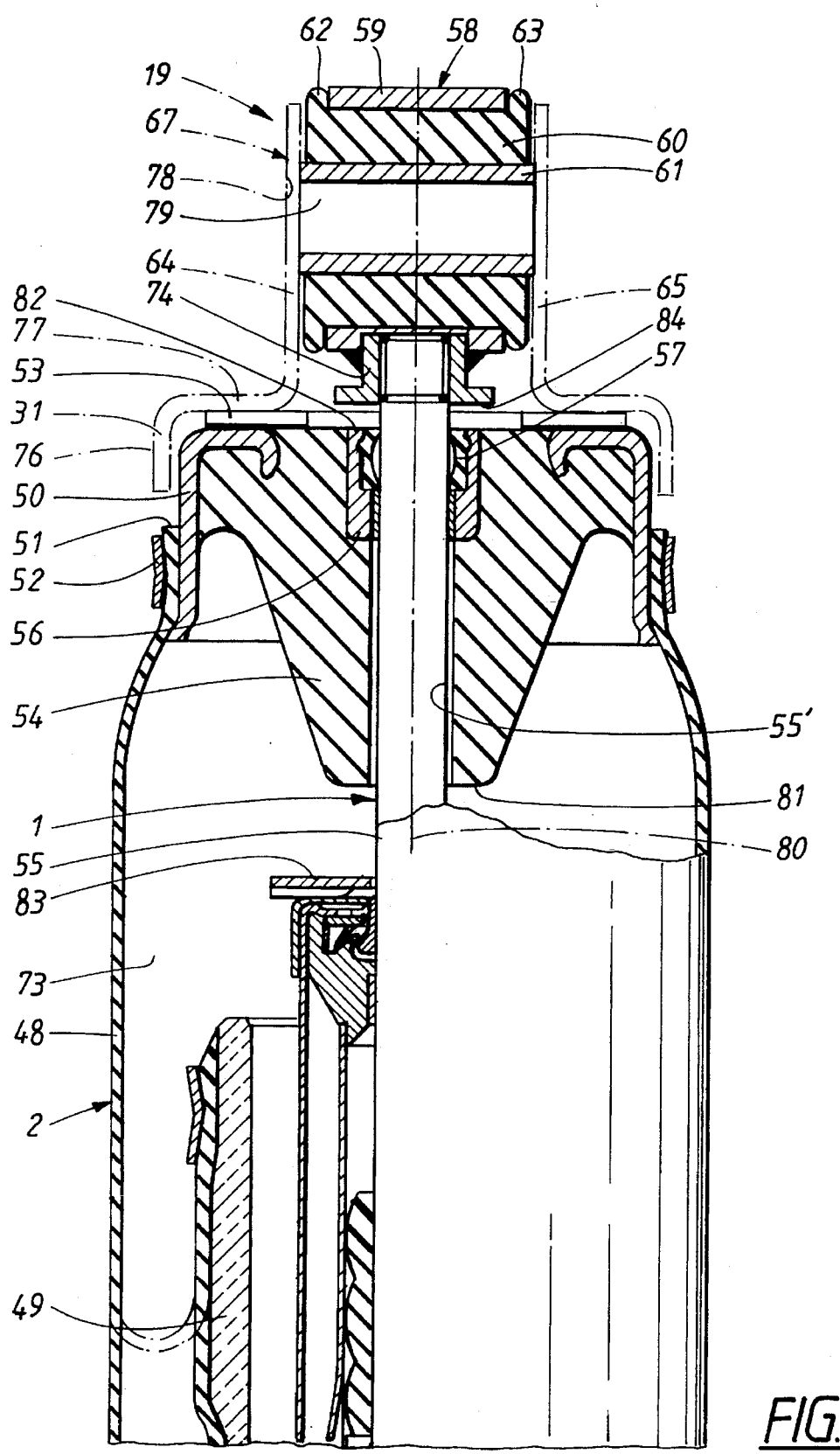
FIG. 5 shows a partly exposed longitudinal section through a suspension arrangement according to the embodiment of FIGS. 3 and 4.

The section in FIG. 5 more precisely shows the construction of the upper end of a suspension arrangement according to the invention. The embodiment depicts the type shown in FIGS. 3 and 4 with air springs having an elastic casing 48, for instance of rubber, which enclose the shock absorber both above and below in an airtight manner, wich is partly shown in FIG. 5. In order to permit a necessary spring movement, the casing 48 is folded and fixedly clamped to the lower part 49 of the shock absorber which is fixedly attached below by means of its lower fastening 38 to the base bracket 36 (see FIG. 4). The casing however presents a very limited elasticity in as far as concerns the material's stretchability so that the required bearing capabilities are maintained. The casing is conversely elastic in as far as concerns the material's bendability so that during sprung movement it can "roll" at its lower portion, which is indicated in dot-dashed lines in FIG. 5. The casing is thus made from a sheet of rubber elastic which is strengthened by a diagonally running cord. The upper part of the air spring presents a carrier member 50 which is made in a relatively rigid, sturdy material such as metal, and is formed like an annular flange with a cylindrically formed surface 51, to the outside of which the elastic casing 48 is fixedly clamped by means of a clamp ring 52. In accordance with the invention the carrier member 50 is integrated with an elastic body 54, said body 54 being made in an elastic material such as for example rubber. This body presents a flange-like insert 53 and forms additionally the shape of a sleeve around the upper, rod-formed part 55 of the shock absorber 1 and therefore presents a cylindrical hollow 55 therethrough, through which the upper part of the shock absorber 1 extends. The elastic body 54 has a relatively large extension in the longitudinal direction of the shock absorber in order to give stability to the carrier member 50 and, at the same time, due to its elasticity, allows certain angular movements of the carrier member 50 and even certain displacements from its centred position around the upper shock absorber part 55. For sealing and guiding against the shock absorber part 55, the elastic body 54 is attached to a guide sleeve 56 which encloses an annular piston seal 57.

The upper shock absorber fastening 58 is fixedly attached to the upper end of the shock absorber's upper part 55 and, in the shown example, is screwed on by means of a bush 74 onto a threaded end portion 75 of the shock absorber part 55, and is made with an outer rigid sleeve 59 of metal which encloses an elastic bush 60, for example of rubber, presenting the form of a hollow cylinder which surrounds an inner sleeve 61 formed similarly in a rigid material, preferably metal. The inner sleeve 61 presents a somewhat greater length than the outer sleeve 59 as shown in FIG. 5 at the same time as which the elastic bush 60 presents two annular flanges 62, 63, whereby the risk of rigid contact in the sideways direction is avoided between the outer sleeve 59 and the portions which are supported by the suspension arrangement, in the present case the portions of coupling arrangement for the cab.

A part of the second coupling part 19 described above is shown in FIG. 5 as two dot-dashed side pieces 64, 65. Of these two side pieces 64, 65 one side piece 64 is shown in FIG. 4 and thus forms a part of the carrier bracket 67 which supports the coupling part 19 with the lock mechanism, The bracket 67 is formed as a single assembled part where both side parts 64, 65 are suitably coupled to each other by means of a joining portion (not shown) and continue downwardly to the afore-mentioned upper spring cup 31 which is formed with a downwardly directed collar flange 76 and a support portion 77 which is intended to be carried by the carrier member 50 of the suspension arrangement. The bracket 67 of the coupling part surrounds the upper shock absorber fastening 58 with its two side parts 64, 65 being on respective sides thereof, said side parts being positioned at a mutual distance such that the elastic bush 60 of the shock absorber fastening and the inner attachment sleeve 61 are contained between said side pieces 64, 65. These present holes 78 aligned with the sleeve 61 suitably having a diameter which essentially corresponds to the diameter of the bore 79 of the sleeve 61 so that a screw (not shown) can be passed through said holes and bore in order to clamp the inner sleeve 61 between side pieces 64, 65 by means of a nut. By means of their design the upper shock absorber fastening is maintained positionally guided such that it is, to a large degree, limited against movements in the sideways direction relative to the coupling part 19, i.e. transverse to the longitudinal direction 80 of the suspension arrangement shown in dot-dashed lines, but allows a damped movement of the outer sleeve 59 of the upper fastening 58 due to the elasticity of the elastic bush 60 and thereby the upper part 55 of the shock absorber with respect to said second coupling part 19 or vice versa.

By means of the above-described construction of the suspension arrangement according to the invention it is therefore achieved that the upper part which is to be supported in a shock-absorbing and sprung manner (the vehicle cab 3 in the shown embodiment) is connected with the suspension arrangement both via the elastic element 60 in the upper fastening 58 of the shock absorber and via the carrier member 50 which is separated from said fastening and arranged in the upper end of the spring. In this way according to the invention the upper shock absorber fastening is unloaded from the static load which instead is substantially taken up by the spring. In this way the elastic element 60 can be given a well-adapted stiffness which imparts high-grade vibration-isolation characteristics to the suspension arrangement and no notice has to be taken of the opposing requirement for having the ability to take up large static loads. The elastic element 60 can thus be given a considerably lower stiffness, either by the choice of the material's characteristics or by changes to the geometrical shape of the element. The element can for example be designed by using an amplitude-dependent stiffness with a low stiffness for vibrations with low amplitude and a stiffness which increases for larger amplitudes. The stiffness can also be made dependent on the vibration frequency.

The good vibration-isolation characteristics by means of the load-bearing arrangement according to the invention are obtained since the spring absorbs sound vibrations better than the shock absorber, i.e. vibrations essentially within the range 60–200 Hz which are at a considerably higher frequency than the other movements which arise due to unevenness in the surface on which the vehicle moves. The static load transfer is thus taken up via the spring of which the upper part in addition to being moveable together with the upper part of the shock absorber, is also moveable with respect to this, i.e. relative to the rod 55 which, to a lesser degree, thus absorbs these sound vibrations without allowing movements to occur which have an amplitude which lies within the chosen clearance for the movement of the top part relative to the rod between its end positions. These sound vibrations are absorbed on the other hand to a high degree by means of the elastic element 60 so that the inner sleeve 61 and the comparable part of the fastening to the cab or similar are de-insulated to a high degree.

Apart from the characteristics described above, a good moveability of the lower coupling part 19 is achieved by means of the suspension arrangement according to the invention and therewith an adaptability of this to the sideways position of the coupling part 20 belonging to the cab so that this is easily guided into the lower coupling part. This is achieved not only through the moveability which is given by the sideways directed shock absorber 40 but also through the elastic connection of the elastic body 54 with the carrier member 50. Additional characteristics of the elastic element 54 are that it presents abutment surfaces 81, 82 both above as well as below for abutment against a lower, upwardly-directed abutment surface 83 in the lower shock absorber part 49 as well as a downwardly-directed abutment surface 84 in the upper shock absorber fastening 58 respectively. By cooperation between these abutment surfaces, the end positions of the relative movements of the spring 2 and shock absorber 1 respectively are defined, said abutment surfaces by means of the constructions of the elastic body 54 being equally elasticly flexible and thereby even the movements at the end positions being damped.

The invention is not limited to the embodiment described above and shown in the drawings but can be varied within the scope of the appended claims. For example the embodiment shown in FIG. 5 can equally be applied to the type of suspension arrangement shown in FIG. 1 and 2 with mechanical springs. In this way the upper end of the mechanical spring can act directly on the upper spring cup 31.

We claim:

1. A shock absorber and suspension apparatus for supporting a tiltable vehicle cab on a chassis comprising at least one first shock absorber, a corresponding at least one spring member attached in parallel to said at least one first shock absorber, said at least one first shock absorber and corresponding at least one spring member being releasably coupled between said vehicle cab and said chassis, a first coupling member attached to said vehicle cab, a second coupling member attached to both said at least one first shock absorber and said at least one spring member, said first and second coupling members being releasably attachable to each other and including guiding means for ensuring coupling together of said first and second coupling members, said at least one first shock absorber including an upper portion including attachment means for attaching said upper portion of said at least one first shock absorber to said second coupling member, said attaching means including damping means for damping motion of said vehicle cab, said at least one spring member including an upper portion including a carrier member, whereby said carrier member can bear the static load acting on said shock absorber and suspension apparatus separately from said at least one first shock absorber, and at least one second shock absorber connecting said second coupling member to said chassis, arranged substantially transverse to said at least one first shock absorber, and arranged substantially perpendicular to a longitudinal axis of the chassis.

2. The shock absorber and suspension apparatus of claim 1 wherein said at least one first shock absorber includes a lower portion telescopingly displaceable with respect to said upper portion, said upper portion further including a rod slidable therewith for guiding said upper portion of said at least one shock absorber.

3. The shock absorber and suspension apparatus of claim 2 wherein said upper portion of said at least one spring member also includes an elastic body affixed to said carrier member so as to provide said carrier member with an elastic connection to said upper portion of said at least one spring member.

4. The shock absorber and suspension apparatus of claim 3 wherein said carrier member comprises a relatively rigid material.

5. The shock absorber and suspension apparatus of claim 3 wherein said upper portion of said at least one spring member includes a guide bush for guiding said slidable rod in a gas-tight manner therethrough.

6. The shock absorber and suspension apparatus of claim 5 wherein said slidable rod includes upper and lower abutment members defining the range of motion of said slidable rod with respect to said elastic body.

7. The shock absorber and suspension apparatus of claim 1 wherein said upper portion of said at least one first shock absorber includes spring means having a low stiffness within a low amplitude range and a high stiffness within a high amplitude range of those movements to be damped thereby.

8. The shock absorber and suspension apparatus of claim 1 wherein said upper portion of said at least one first shock absorber includes spring means having a high stiffness within a low frequency range and a low stiffness within a high frequency range for those movements which are to be damped thereby.

9. The shock absorber and suspension apparatus of claim 1 wherein said at least one spring member comprises a gas-operated spring, and wherein said carrier member comprises a rigid upper portion thereof.

10. The shock absorber and suspension apparatus of claim 9 wherein said at least one spring member comprises an elastic casing forming a housing comprising a gas-tight compartment.

11. The shock absorber and suspension apparatus of claim 1 including a pair of said first shock absorbers and a corresponding pair of spring members, each of said pairs being located at pivotable connections between said vehicle cab and said chassis, including an additional pair of said plurality of first shock absorbers and said corresponding spring members comprising said releasably coupled members.

12. The shock absorber and suspension apparatus of claim 11 wherein said pivotable connections comprise link arms including a pair of pivot axes.

* * * * *

UNITED STATES PATENT AND TRADEMARK OFFICE
CERTIFICATE OF CORRECTION

PATENT NO.  : 5,590,733
DATED       : January 7, 1997
INVENTOR(S) : Bengt Ljungholm et al.

It is certified that error appears in the above-identified patent and that said Letters Patent is hereby corrected as shown below:

Column 1, line 10, delete "Dart" and insert therefor --part--.
Column 1, line 18, delete "1a" and insert therefor --a--.

Signed and Sealed this

Twenty-second Day of April, 1997

Attest:

BRUCE LEHMAN

*Commissioner of Patents and Trademarks*

Attesting Officer